(12) United States Patent
Hayashi et al.

(10) Patent No.: US 7,108,941 B2
(45) Date of Patent: Sep. 19, 2006

(54) FLAT BATTERY AND PRODUCTION METHOD THEREFOR

(75) Inventors: Tetsuya Hayashi, Kadoma (JP); Makoto Nakanishi, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 323 days.

(21) Appl. No.: 10/398,352

(22) PCT Filed: Oct. 4, 2001

(86) PCT No.: PCT/JP01/08773

§ 371 (c)(1),
(2), (4) Date: Apr. 4, 2003

(87) PCT Pub. No.: WO02/29913

PCT Pub. Date: Apr. 11, 2002

(65) Prior Publication Data
US 2004/0048151 A1    Mar. 11, 2004

(30) Foreign Application Priority Data

Oct. 5, 2000    (JP) ............................ 2000-305781
Nov. 28, 2000   (JP) ............................ 2000-360728

(51) Int. Cl.
*H01M 6/46*    (2006.01)
*H01M 6/12*    (2006.01)

(52) U.S. Cl. ...................... 429/162; 429/127; 429/211; 429/128; 429/124; 429/231.95; 29/623.1

(58) Field of Classification Search ................ 429/162, 429/127, 211, 128, 124, 231.95; 29/623.1
See application file for complete search history.

(56) References Cited

U.S. PATENT DOCUMENTS 3,472,699 A * 10/1969 Reisman et al. .............. 429/81
6,171,724 B1 * 1/2001 Li et al. ...................... 429/217
6,451,478 B1 * 9/2002 Okahisa et al. ............. 429/162

FOREIGN PATENT DOCUMENTS

| JP | 59-066055 | * | 4/1984 |
| JP | 61-168555 | | 10/1986 |
| JP | 01-309251 | | 12/1989 |
| JP | 11-073942 | | 3/1999 |
| JP | 2000-164259 | * | 6/2000 |
| JP | 2000-182594 | | 6/2000 |

* cited by examiner

*Primary Examiner*—Patrick Joseph Ryan
*Assistant Examiner*—Angela J. Martin
(74) *Attorney, Agent, or Firm*—Jordan and Hamburg LLP

(57) ABSTRACT

A positive electrode plate (7) and a negative electrode plate (8) are coiled around with a separator (9) interposed therebetween into a flat shape having a rectangular plan to obtain an intermediate product (17) of an electrode plate group, whose corners are then cut off along straight or curved lines to obtain a substantially octagonal electrode plate group (1*a*, 1*b*), so that it is accommodated in a negative electrode case (5) having a circular plan with good space efficiency. The problem of residual water in the coiled electrode plate group (1*a*, 1*b*, 1*c*) of a coin type battery having high load current characteristics is resolved by a vacuum dry treatment, and the problem of dust generated during the welding of leads is resolved by a method whereby dust is not scattered inside the case. Flat batteries with higher reliability are thus obtained.

16 Claims, 13 Drawing Sheets

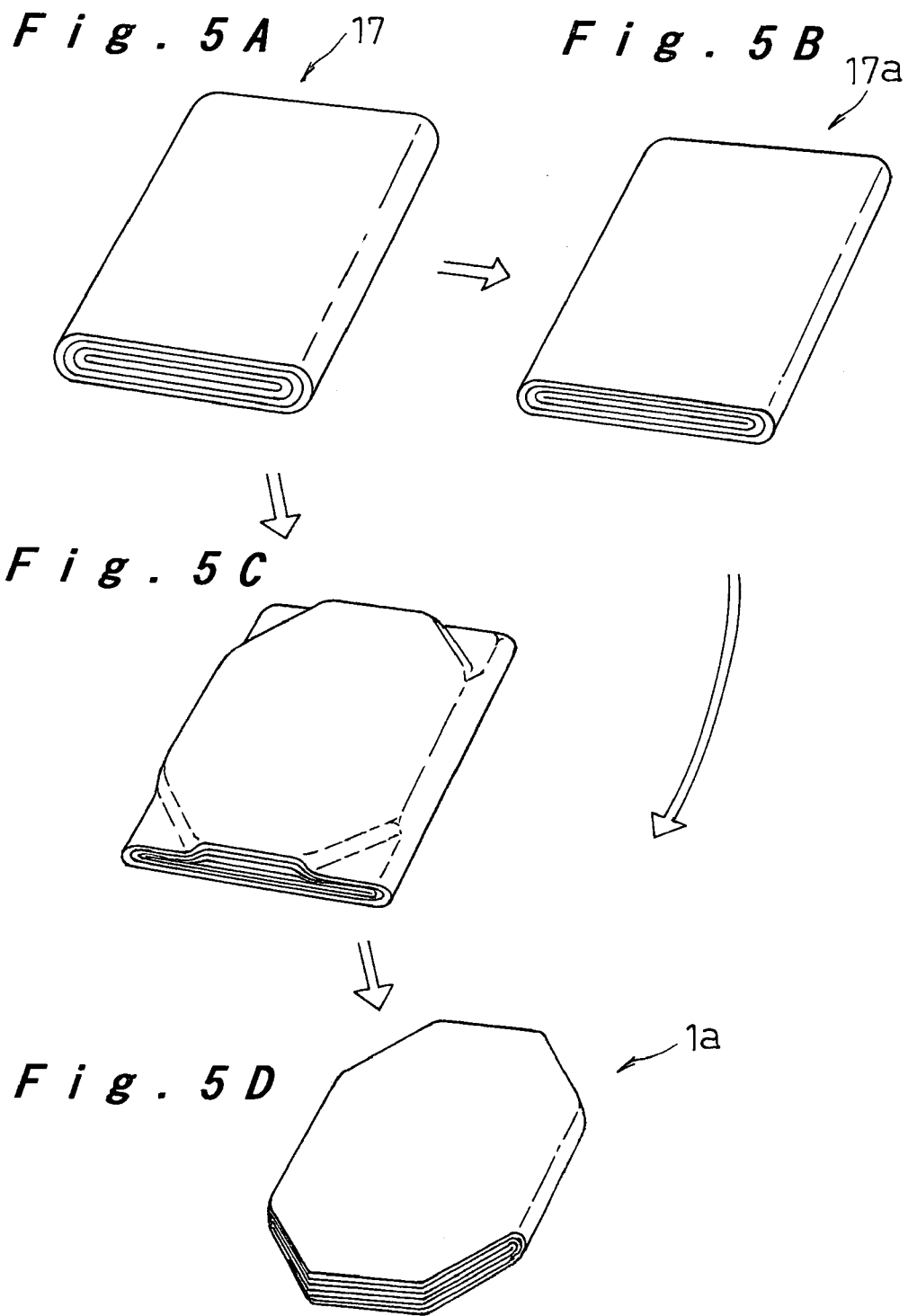

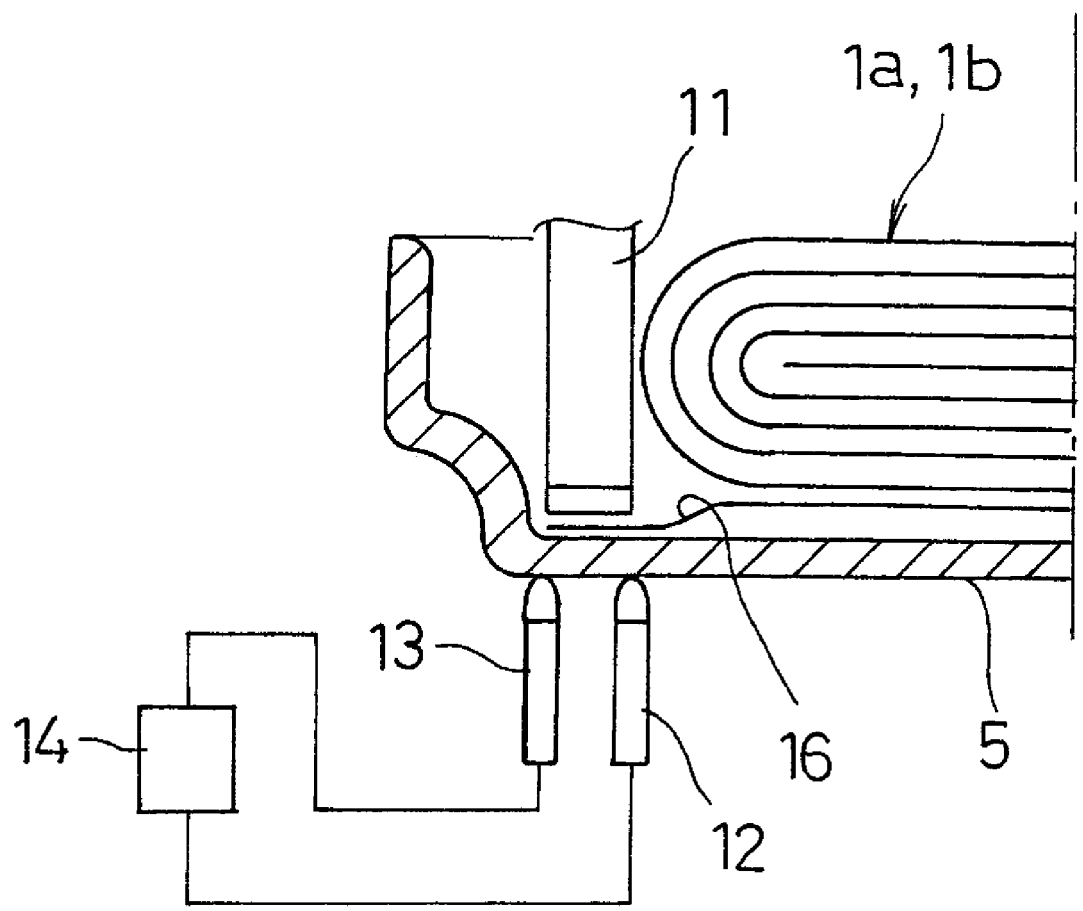

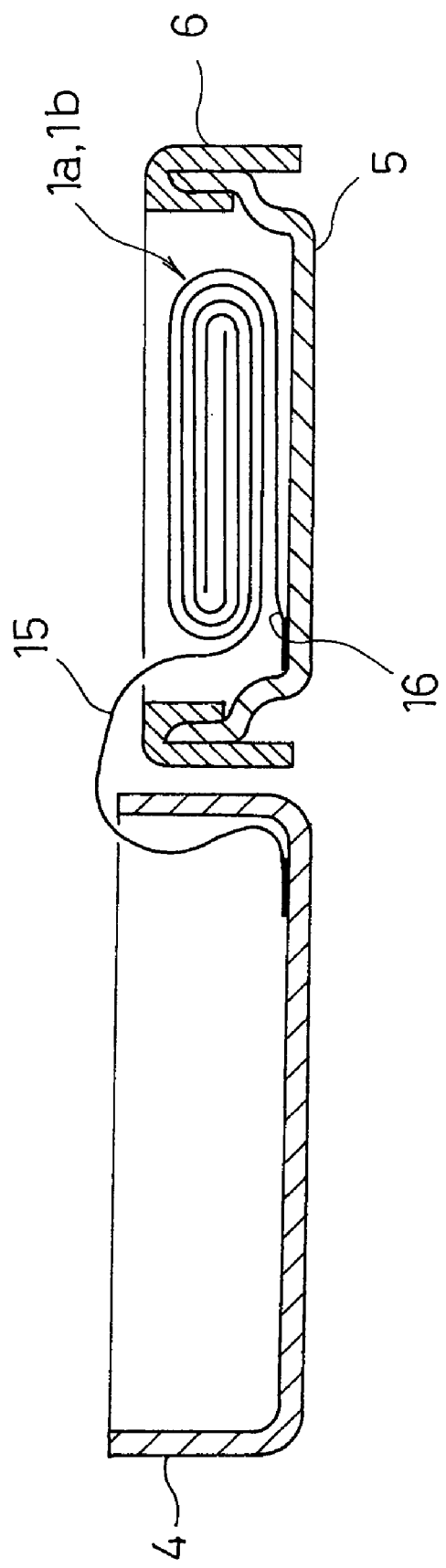

FLAT BATTERY AND PRODUCTION METHOD THEREFOR

TECHNICAL FIELD

The present invention relates to a flat battery having an electrode plate group of a coiled structure accommodated in a flat battery case made by coupling oppositely arranged open ends of a positive electrode case and a negative electrode case of half shell form, and a manufacturing method of this battery.

BACKGROUND ART

Flat batteries such as button type batteries and coin type batteries have widely been used as power sources for small or thin devices such as wrist watches and hearing aids or IC cards.

FIG. 16 illustrates a conventional coin type battery, which is a typical flat battery. A positive electrode pellet 32 and a negative electrode pellet 33 of disk-like form are placed opposite each other with a separator 34 interposed between them inside a negative electrode case 35 of circular half shell form having a stepped lateral wall. Liquid electrolyte is injected into this case, a positive electrode case 31 is coupled to the open end of the negative electrode case 35 with a gasket 36 fitted therebetween, and the open end edge of the positive electrode case 31 is crimped or bent inwards so as to tightly seal the inner space formed between the positive and negative electrode cases 31 and 35.

Coin type batteries having such a structure wherein one positive electrode pellet 32 and one negative electrode pellet 33 are arranged opposite each other can have only a small continuous discharge current of several tens of mA because of the small reaction area where the positive and negative electrode plates face to each other, so that they have only been used for devices that require a small load current.

To achieve a large discharge current, it is necessary to increase the facing area between positive and negative electrode plates. Electrode plate groups having a structure that allows the reaction area to be increased such as a layered structure or a coiled structure have widely been used for batteries other than coin type batteries. Japanese Patent Laid-Open Publication No. 2000-164259 discloses a flat battery incorporating one such electrode plate group of a layered or coiled structure accommodated in a flat battery case having a small height so as to achieve higher discharge current. This flat battery accommodates the electrode plate group, which is formed into a thin prismatic shape by the coiled or layered structure, in a prismatic positive electrode case.

This electrode plate group of coiled or layered structure can not be adopted to coin type batteries that have a circular plan, because accommodating rectangular electrode plate group in a circular positive electrode case results in insufficient battery capacity because of the low volume efficiency of the battery.

Another problem in constructing a battery using non-aqueous electrolyte such as a lithium ion rechargeable battery in a flat shape is that, if the electrode plate group of the coiled structure contains water, it generates hydrogen gas during the initial charge and discharge. Water may also cause swelling of the electrode plates, which will lead to swelling of the outer case.

The gas generated during the initial period of use may change the thickness of the coiled electrode plate group and cause variations in the pressure distribution in the group. This may lead to buildup of ions in low-pressure portions or cause swelling of the outer case.

The positive and negative electrode plates forming the electrode plate group are electrically connected to respective cases by pressure contact or by welding. For the electrode plate group of a coiled structure, the connection can be achieved with highest reliability by welding. Spot welding, for example, is carried out as shown in FIG. 17: A negative electrode lead 45 is pressed against a negative electrode case 44 by a pair of welding electrodes 40, 41, and welding current is applied thereacross from a welding power source 48. However, sparks thrown and dust scattered during the welding may cause internal short-circuiting or buildup of ions.

An object of the present invention is to provide a flat battery that resolves the above problems found in flat batteries accommodating electrode plate groups of a coiled structure within thin spaces so as to increase discharge capacity, and a manufacturing method of this flat battery.

DISCLOSURE OF THE INVENTION

According to a first aspect of the present invention there is provided a flat battery wherein a strip of positive electrode plate and a strip of negative electrode plate are coiled around with a separator interposed therebetween into a flat electrode plate group, which is accommodated in an inner space made by coupling oppositely arranged open ends of a positive electrode case and a negative electrode case of half shell form, characterized in that: the electrode plate group includes a positive electrode lead formed at one end of the positive electrode plate at a position offset toward one side in a widthwise direction thereof and a negative electrode lead formed at one end of the negative electrode plate at a position offset in the widthwise direction thereof toward opposite side of the positive electrode lead; the positive electrode plate and the negative electrode plate are coiled around to have a width smaller than that of an accommodating space of the inner space such that their ends at which the positive electrode lead and the negative electrode lead are formed are coiling finish ends of the electrode plate group; and the positive electrode lead and the negative electrode lead are welded to respective predetermined portions between the accommodating space and the electrode plate group at both ends thereof in a coiling direction.

According to the construction of the first aspect of the invention, the positive electrode lead and negative electrode lead are located at different positions of the finished electrode plate group, so that there are no large variations in the distribution of a retaining force applied to the electrode plate group when it is accommodated inside the battery for keeping it in shape, and the positive and negative electrode plates remain in uniform facing state with each other. Also, because the positive and negative electrode leads are welded to the case through the space formed on both sides of the electrode plate group, the length of the leads are made shorter.

According to a second aspect of the present invention there is provided a method of manufacturing a flat battery including the steps of: forming a strip of positive electrode plate and a strip of negative electrode plate respectively having a constant width, and comprising a collector and active material applied on both faces thereof; coiling the positive electrode plate and the negative electrode plate into a flat shape having a rectangular plan, with a strip of separator having a constant width interposed therebetween, to form an intermediate product of an electrode plate group;

cutting off four corners of the intermediate product in a thickness direction thereof along straight or curved lines to form a substantially octagonal electrode plate group; accommodating the electrode plate group in an inner space having a circular plan formed by coupling oppositely arranged open ends of a positive electrode case and a negative electrode case of half shell form; and sealing the open ends.

According to the method of manufacturing a flat battery of the second aspect of the invention, the electrode plate group of the coiled structure is formed in a flat shape having a rectangular plan by coiling around the positive and negative electrode plates with the separator therebetween, and the four corners thereof are cut off so that it is approximately octagonal. The electrode plate group is therefore accommodated inside the space having a circular plan made by the positive and negative electrode cases with less unoccupied space. This feature, coupled with the coiled structure, increases the facing area between the positive and negative electrode plates. Flat batteries having high load current characteristics are thus obtained.

According to a third aspect of the present invention there is provided a method of manufacturing a flat battery including the steps of: forming a strip of positive electrode plate and a strip of negative electrode plate respectively comprising a collector and active material applied on both faces thereof and having a plurality of layer faces coupled together by connecting pieces and formed in a shape corresponding to an accommodating space having a circular plan; folding the positive electrode plate and the negative electrode plate at the connecting pieces and coiling them into a flat shape such that the respective layer faces are layered upon one another, with a strip of separator interposed therebetween, to form an electrode plate group; accommodating the electrode plate group in an inner space formed by coupling oppositely arranged open ends of a positive electrode case and a negative electrode case of half shell form; and sealing the open ends.

According to the method of manufacturing a flat battery of the third aspect of the invention, the layer faces of the positive and negative electrode plates, which are coiled around into the electrode plate group of flat form with the separator therebetween, are formed in the shape corresponding to that of the accommodating space made by the positive and negative electrode cases. Thus, the electrode plate group is accommodated in the space with less unoccupied space. This feature, coupled with the coiled structure, increases the facing area between the positive and negative electrode plates. Flat batteries having high load current characteristics are thus obtained.

According to a fourth aspect of the present invention there is provided a method of manufacturing a flat battery including the steps of: forming an electrode plate group by coiling around a positive electrode plate and a negative electrode plate respectively comprising a collector and active material applied on both faces thereof into a flat shape with a separator interposed therebetween; placing the electrode plate group in one of outer cases consisting of a positive electrode case and a negative electrode case of half shell form; drying the accommodated electrode plate group within a vacuum dry oven; injecting liquid electrolyte; and sealing an interface of the positive electrode case and the negative electrode case.

According to the method of manufacturing a flat battery of the fourth aspect of the invention, not only the electrode plate group but also the case and jigs undergo the drying treatment, whereby the subsequent impregnation of non-aqueous electrolyte is carried out in a favorable condition wherein no water component is left. No buildup of gas or swelling of electrode plates resulting from residual water occurs after the electrode plate group is assembled into a flat battery. High quality flat batteries are thus manufactured.

According to a fifth aspect of the present invention there is provided a method of manufacturing a flat battery including the steps of: forming an electrode plate group by coiling around a positive electrode plate having a positive electrode lead at one end thereof and a negative electrode plate having a negative electrode lead at one end thereof with a separator interposed therebetween into a flat shape such that the coiled electrode plate group has the positive electrode lead on one face thereof and the negative electrode lead on the other face thereof at a coiling finish end thereof; placing the electrode plate group in one of outer cases consisting of a positive electrode case and a negative electrode case of half shell form; welding the positive electrode lead to an inner face of the positive electrode case by ultrasonic welding; welding the negative electrode lead to an inner face of the negative electrode case by series welding, wherein while the negative electrode lead is pressed against the inner face of the negative electrode case with an insulating supporter, a pair of welding electrodes is brought to pressure contact with an outer face of the negative electrode case opposite a position where the negative electrode lead is pressed inside, and welding current is applied across the pair of welding electrodes in this state; and sealing an interface of the positive electrode case and the negative electrode case.

According to the method of manufacturing a flat battery of the fifth aspect of the invention, because the lead is welded to the case by series welding using a pair of welding electrodes abutted on the outer face of the case, sparks and dust generated during the welding do not scatter inside the case. Buildup of ions and internal short-circuiting resulting from sparks and dust scattered onto the electrode plate group or inside the case are thereby prevented. The reliability of flat batteries is thus improved by the welding method which is effective in increasing discharge characteristics of batteries.

According to a sixth aspect of the present invention there is provided a method of manufacturing a flat battery including the steps of: accommodating an electrode plate group in an inner space formed by coupling oppositely arranged open ends of a half-shell form positive electrode case and a negative electrode case, the electrode plate group comprising a positive electrode plate and a negative electrode plate coiled around with a separator interposed therebetween; and joining the positive electrode case and the negative electrode case with a gasket fitted in an interface of respective lateral peripheral surfaces thereof, characterized in that one of or both of the positive electrode case and the negative electrode case is formed with an inward indentation in a bottom face thereof so that the positive electrode case and the negative electrode case are joined to keep the accommodated electrode plate group in shape.

According to the method of manufacturing a flat battery of the sixth aspect of the invention, when the positive and negative electrode cases are joined together, the indentation provides a constraining force for the electrode plate group accommodated therein to keep it in its shape. Accordingly, it is prevented that the layered condition of the electrode plates is changed by the pressure of gas generated during the initial use of the battery.

According to a seventh aspect of the present invention there is provided a method of manufacturing a flat battery including: forming a strip of positive electrode plate and a strip of negative electrode plate respectively comprising a collector and active material applied on both faces thereof; coiling around the positive electrode plate and the negative electrode plate into a flat shape having a rectangular plan, with a strip of separator interposed therebetween, to form an intermediate product of an electrode plate group; applying pressure to the intermediate product under a temperature equal to or lower than a softening temperature of the separator to form an electrode plate group having predetermined shape and dimensions; accommodating the electrode plate group in an inner space formed by coupling oppositely arranged open ends of a positive electrode case and a negative electrode case of half shell form; and sealing open ends.

According to the method of manufacturing a flat battery of the seventh aspect of the invention, by application of heat and pressure, the coiled intermediate product of the electrode plate group is formed into desired shape and dimensions corresponding to the accommodating space of electrode plate group. The pressure also causes the layering pressure of electrode plates uniform, whereby buildup of ions in low-pressure portions because of uneven pressure distribution is prevented, and also, when cutting the four corners of the intermediate product, inter-layer short-circuiting is prevented.

BRIEF DESCRIPTION OF THE DRAWINGS

FIGS. 5A, 5B, 5C, and 5D are perspective views illustrating the process steps of heat-pressing and cutting the intermediate product;

FIG. 8 is an explanatory view illustrating a method of welding a negative electrode lead;

FIG. 9 is an explanatory view illustrating a method of welding a positive electrode lead in a vacuum-dried state;

BEST MODE FOR CARRYING OUT THE INVENTION

Preferred embodiments of the present invention will be described with reference to the accompanying drawings for a better understanding of the present invention. It should be noted that the embodiments described below are merely examples of carrying out the invention and should not pose any limitation on the technical scope of the invention.

Flat batteries according to the embodiments described below are constructed, as one example, as lithium ion coin type rechargeable batteries. As shown in the cross section of FIG. 1, an electrode plate group $1a$, $1b$ of a coiled structure, in which a positive electrode plate and a negative electrode plate are coiled around with a separator interposed therebetween, is accommodated in an inner space formed by coupling and sealing a positive electrode case 4 and a negative electrode case 5 of circular half shell form. The flat battery is thus formed in a coin shape to have high load current characteristics.

Figure 2A:
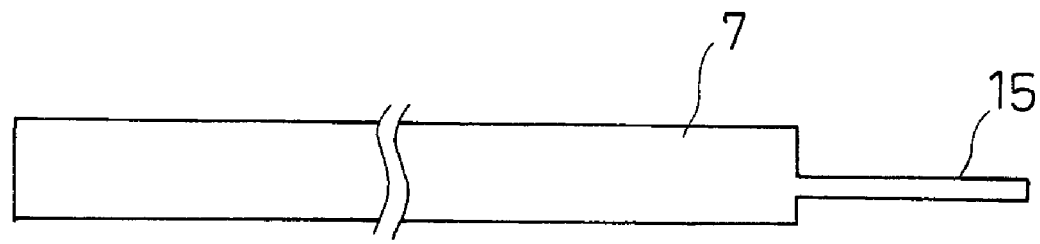
FIGS. 2A, 2B, and 2C are respective expanded views of a positive electrode plate, a negative electrode plate, and a separator constituting the electrode plate group of this embodiment of the invention.
Figure 2B:
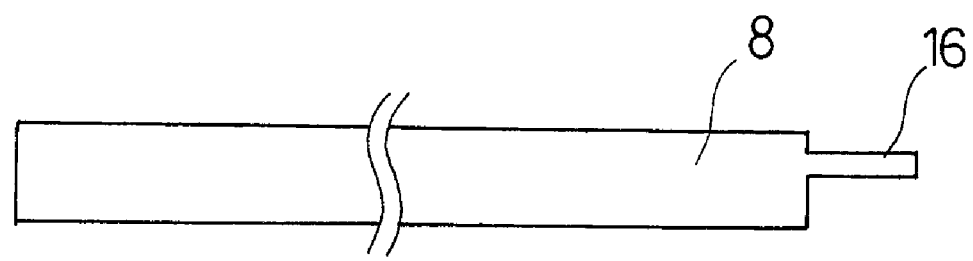
Figure 2C:
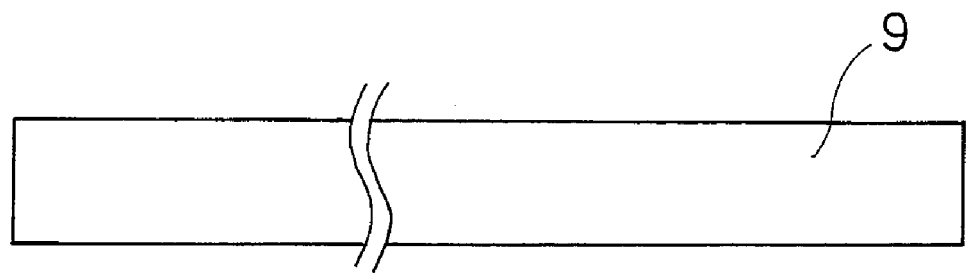

The electrode plate group $1a$, $1b$ is fabricated as follows: A strip of positive electrode plate 7 having a constant width as shown in FIG. 2A and a strip of negative electrode plate 8 having a constant width as shown in FIG. 2B are coiled around into a flat shape, with a strip of separator 9 having a constant width as shown in FIG. 2C being interposed therebetween, to form an intermediate product 17 of electrode plate group shown in FIG. 3, which is rectangular in plan view. Four corners of this intermediate product 17 are cut off along straight or curved lines as shown by broken lines in FIG. 4A and FIG. 4B, whereby an electrode plate group $1a$ or $1b$ respectively shown in FIG. 6 or FIG. 7 is obtained.

Figure 6:
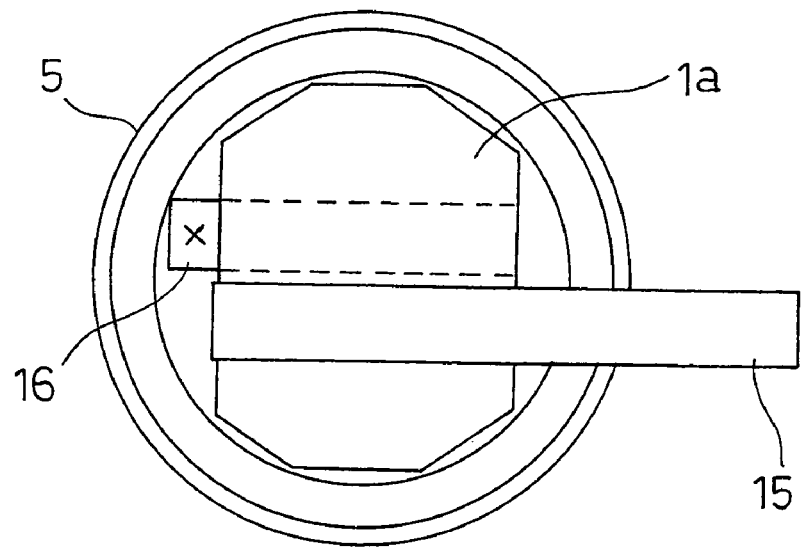
FIG. 6 is a plan view of an electrode plate group accommodated in a negative electrode case.
Figure 7:
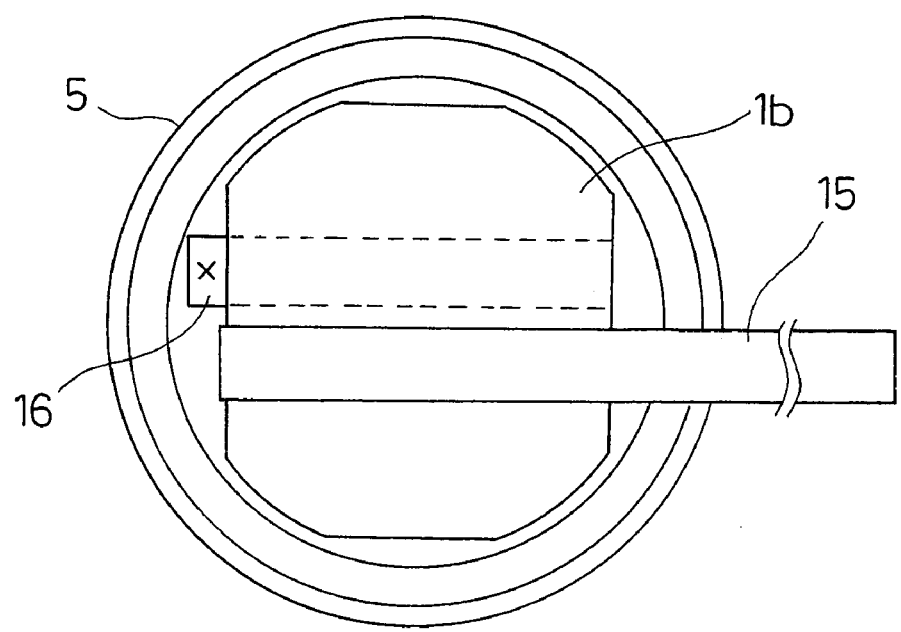
FIG. 7 is a plan view of an electrode plate group accommodated in a negative electrode case.

FIG. 6 is a plan view of the electrode plate group $1a$ accommodated in the negative electrode case 5. The electrode plate group is formed in an octagonal shape so as not to leave unoccupied space inside the circular space of the negative electrode case 5. Obviously, the electrode plate group $1b$ whose corners have been cut off along curved lines has better space efficiency when accommodated in the negative electrode case 5, as shown in FIG. 7. This, coupled with the effects of the coiled structure, enables construction of a coin type battery with good volume efficiency, i.e., large capacity per volume. These electrode plate groups $1a$, $1b$ are manufactured as follows:

The positive electrode plate 7 is punched out to have a predetermined width and length as shown in FIG. 2A from positive electrode material, which is obtained by coating active materials on both sides of a positive electrode collector made of aluminum foil. A positive electrode lead 15 is formed by an extension of one end of the collector, which will be the coiling finish end. The negative electrode plate 8 is punched out to have a predetermined width and length as shown in FIG. 2B from negative electrode material, which is obtained by coating active materials on both sides of a negative electrode collector made of copper foil. A negative electrode lead 16 is formed by an extension of one end of the collector, which will be the coiling finish end. The separator 9 is made of microporous polyethylene film and formed as a tape having a larger width than that of the positive and negative electrode plates 7, 8, as shown in FIG. 2C.

Figure 3:
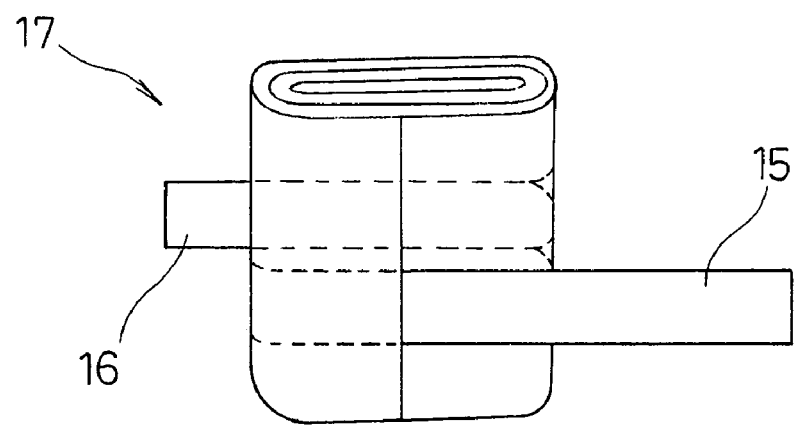
FIG. 3 is a perspective view illustrating the structure of an intermediate product of an electrode plate group.

These positive and negative electrode plates 7, 8 are coiled around in a flat shape with the separator 9 interposed therebetween to form the flat intermediate product 17 of electrode plate group shown in FIG. 3, which is rectangular in plan view. They are coiled so that the intermediate product 17 has the positive electrode lead 15 on one flat face thereof, and the negative electrode lead 16 on the other flat face thereof.

Figure 4A:
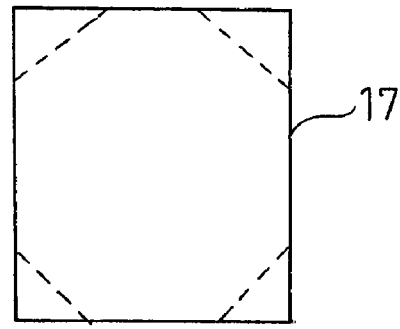
FIG. 4A is an explanatory view illustrating how the intermediate product is cut linearly by a thermal cutter.
Figure 4B:
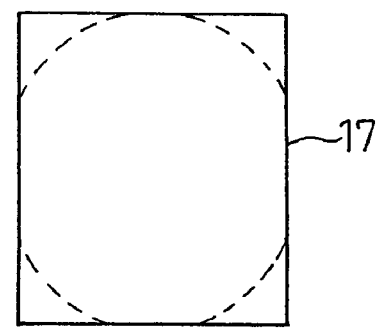
FIG. 4B is an explanatory view illustrating how the intermediate product is cut along an arc in a low temperature environment.

The four corners of this rectangular intermediate product 17 are cut off along broken lines in FIG. 4A and FIG. 4B to form the electrode plate groups 1a, 1b that are approximately octagonal when viewed from above as shown in FIG. 6 and FIG. 7. Cutting can be achieved by a thermal cutter, or by punching along arcs under a temperature of −70° C. or lower.

With the cutting method using a thermal cutter, the corners of the intermediate product 17 are cut off along straight lines by a heated cutter to form the octagonal electrode plate group 1a. With this method, because the cut face of the separator 9 melts due to the heat of the cutter, the layers of separator 9 are joined by molten cut face, so that the coiled electrode plates are kept in shape without using a binding tape. Also, the molten separator 9 covers the cut faces of positive and negative electrode plates 7, 8, whereby inter-layer short-circuiting is prevented.

The temperature condition of −70° C. or lower mentioned above can be achieved by using dry ice or liquid nitrogen. Punching the corners of the intermediate product 17 along arcs under the temperature of −70° C. or lower forms the electrode plate group 1b shown in FIG. 7, which has good space efficiency. With this low temperature punching method, the positive and negative electrode plates 7, 8 exhibit no viscosity when being punched because of the extremely low temperature, so that no inter-layer short-circuiting resulting from ductility of electrode plate metal will occur. However, cut faces of the punched electrode plates 7, 8 need to be covered; a thermosetting resin material may be applied on the punched surfaces and set by applying heat. Inter-layer electric insulation is thereby secured, and the coiled electrode plates are kept in shape without using a binding tape.

Another option is to subject the intermediate product 17 shown in FIG. 5A to a heat-pressing process under a condition in which the temperature is set equal to or lower than the softening temperature of the separator 9, to form the product into the shape shown in FIG. 5B having a certain thickness. The pressure applied on layered positive and negative electrode plates 7, 8 is thereby made constant, whereby possible short circuits across the layers when cutting its corners as shown in FIG. 5D are prevented. The pressing also makes the pressure on layered electrode plates uniform, so that buildup of ions in low pressure portions resulting from uneven pressure distribution is prevented. Pressing molds for heat-pressing the intermediate product 17 should preferably have a configuration that will cause a larger pressure to be applied at corners to be cut off so that the corners will be compressed as shown in FIG. 5C. These compressed corners are cut off by one of the methods mentioned above to obtain the electrode plate group 1a shown in FIG. 5D.

One preferable condition, particularly if the separator 9 is made of polypropylene as noted above, for heat-pressing the intermediate product 17 is to heat the pressing molds at a temperature of 120±5° C. and to apply pressure of 30 to 100 kg for 5 to 10 seconds.

The electrode plate group 1a or 1b shown in FIG. 6 or FIG. 7 thus obtained is accommodated in the negative electrode case 5 which has a circular plan, such that the negative electrode lead 16 is on the bottom side of the case. Since the electrode plate group 1a has an elongated shape, a space is formed between itself and a side wall of the negative electrode case 5, in a direction in which the leads of the electrode plate group 1a are extended. Thus the negative electrode lead 16 can be welded to the negative electrode case 5 at a predetermined location within this space.

Figure 1:
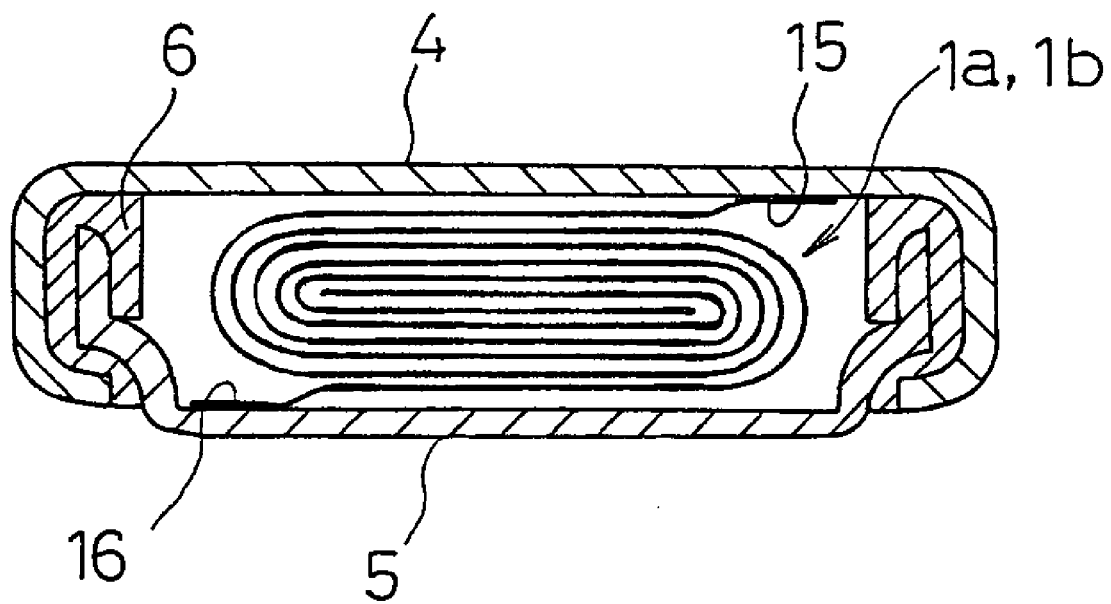
FIG. 1 is a cross-sectional view illustrating the structure of a coin type battery as one example of a flat battery according to one embodiment of the present invention.

The positive and negative electrode leads 15, 16 extend from the electrode plate group 1a, 1b from the positions mutually offset in opposite directions from a center line, as shown in FIG. 2A and FIG. 2B. Accordingly, the positive and negative electrode leads 15, 16 are located at different positions on the electrode plate group 1a, 1b as shown in FIG. 6 and FIG. 7, causing little thickness variations in the electrode plate group 1a, 1b when it is accommodated between the positive and negative electrode cases 4, 5 as shown in FIG. 1. Thus there will be no large discrepancy in the constraining force given for retaining the shape of the electrode plate group 1a, 1b between the electrode cases 4, 5 coupled together.

When the electrode plate group 1a or 1b shown in FIG. 6 or FIG. 7 is accommodated in the negative electrode case 5 with the negative electrode lead 16 placed on the lower side, the distal portion of the lead 16 is reached through the gap between the inner wall of the case 5 and the side face of the electrode plate group 1a, 1b. A welding jig is contacted to the negative electrode lead 16 to weld the same to the case 5.

Figure 17:
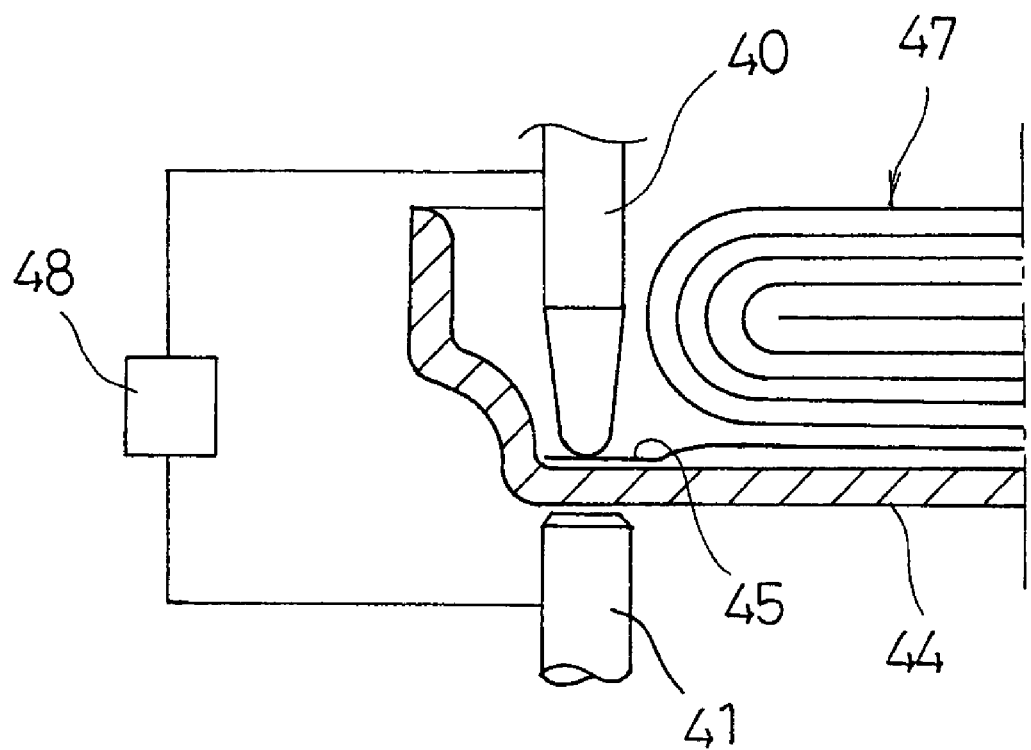
FIG. 17 is an explanatory view illustrating a conventional method of welding a lead.

If spot welding is performed for welding the lead 16 to the inner face of the case 5 by a pair of welding electrodes 40, 41 arranged on the inner side and outer side of the case 5 as shown in FIG. 17, problems will arise due to sparks and dust generated during the welding, which will cause buildup of ions and internal short-circuiting, as mentioned in the foregoing. In view of this, the welding of the negative electrode lead 16 to the case 5 is achieved by series welding in this embodiment.

As shown in FIG. 8, an insulating supporter 11 made of heat-resistant material such as ceramic is inserted into the gap between the electrode plate group 1a, 1b and the negative electrode case 5, and with the negative electrode lead 16 being pressed against the inner face of the case 5 by this insulating supporter 11, a pair of welding electrodes 12, 13 are abutted on an outer face of the case 5 opposite the position where the lead 16 is pressed inside the case 5, and a large current is supplied across the welding electrodes 12, 13 instantly from a welding power source 14. Because the lead 16 is pressed against the case 5 by the insulating supporter 11, the current flows from the welding electrode 12 to the electrode 13 via the case 5 and the lead 16, whereby the lead 16 made of copper foil quickly melts because of the contact resistance between the case 5 and lead 16 and because of the heat generated between the welding electrodes 12, 13, and is welded to the case 5. Sparks and dust are generated only on the outer side of the case 5 and not inside of the case 5 during this welding, thus not resulting in buildup of ions or internal short-circuiting.

The thickness of the separator 9 constituting the electrode plate group 1a, 1b of a lithium ion rechargeable battery is 30 μm or smaller. Furthermore, because of the trend to use thinner separators 9, it is an absolute requirement that no sparks or dust generated during the welding remain inside the case. The above welding method therefore enables fabrication of lithium ion rechargeable batteries having higher reliability. The welding method is also preferable in terms of establishing lead connections, because it enables electrode plate groups 1*a*, 1*b* of the coiled structure to have larger discharge current characteristics.

It is essential for batteries using non-aqueous electrolyte such as lithium ion rechargeable batteries to contain as little remaining water as possible inside the batteries. Water inside batteries will cause generation of hydrogen gas during the initial charge and discharge and swelling of electrode plates, which will lead to swelling of the case and deterioration of battery performance. In this embodiment, after the negative electrode lead 16 of the electrode plate group 1*a*, 1*b* accommodated in the negative electrode case 5 is series-welded to the case 5 as described above, the positive electrode case 4 is placed next as shown in FIG. 9 to which the positive electrode lead 15 is ultrasonic-welded, and these, together with jigs (not shown), are placed inside a vacuum dry oven for a vacuum dry treatment. Preferably, the vacuum dry treatment should be carried out under a temperature of 50 to 90° C. with a vacuum degree of 650 mmHg (86,660 Pa) or more for a period of 3 hours or more.

This vacuum dry treatment removes water in both positive and negative electrode cases 4, 5 and jigs, not to mention the electrode plate groups 1*a*, 1*b*, thereby enabling smooth impregnation of non-aqueous electrolyte, and suppressing generation of gas or swelling of electrode plates. Resultant coin type batteries will have higher reliability.

A resin gasket 6 is fitted on a lateral circumferential portion of the negative electrode case 5 as shown in FIG. 9, and a predetermined amount of liquid electrolyte is injected in the case 5. After a duration of waiting time required for the electrode plate group 1*a*, 1*b* to be saturated with electrolyte, the positive electrode case 4 is coupled upon the negative electrode case 5. The open end of the lateral circumference of the positive electrode case 4 is crimped or bent inwards from outside against the negative electrode case 5, whereby the gasket 6 is compressed onto the step formed on the lateral circumference of the negative electrode case 5. The interface between the cases 4, 5 is thus sealed and a flat battery of a coin shape shown in FIG. 1 is finished.

If generation of gas occurs inside the flat battery constructed as described above, whereupon the coiled state of the electrode plate group 1*a*, 1*bi*; disturbed and the pressure on the layers made unstable, buildup of ion occurs in low-pressure portions. To prevent this, the electrode plate group 1*a*, 1*b* shruld be given constraining force for retaining its shape. To provide such force to thetelectrode plate group 1*a*, 1*b*, one or both of the positive and negative electrode cases 4, 5 may be formed with indentations 118*a*, 118*b*, 119, 120 as shown in FIG. 10A to FIG. 10C.

Figure 10A:
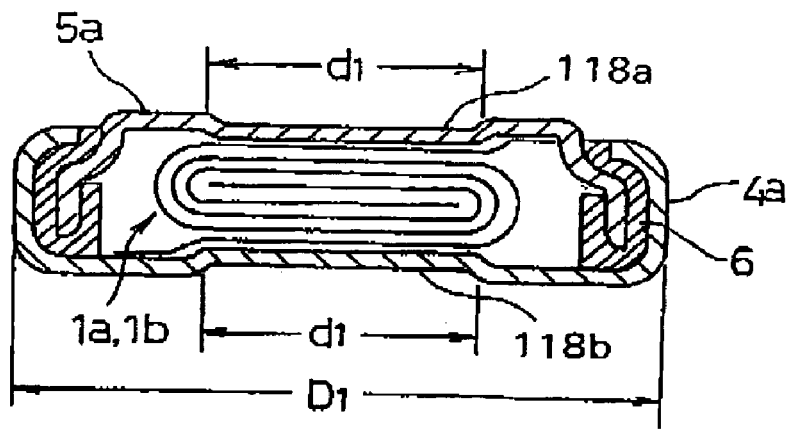
FIGS. 10A, 10B, and 10C are cross sections illustrating first to third embodiments of case structures that provide constraining force for retaining the shape of the electrode plate group.

In the example shown in FIG. 10A, indentations 118*a* and 118*b* are formed respectively in the positive and negative electrode cases 4*a*, 5*a*. The relationship between the diameter d1 of the indentations 118*a* and 118*b* and the diameter D1 of the positive electrode case 4*a* is 0.3 D1 d1 0.7 D1. According to this configuration, when the positive electrode case 4*a* is coupled upon the lateral circumference of the negative electrode case 5*a* with the gasket 6 fitted therebetween and the open end of the lateral circumference of the case 4*a* is crimped for tightly sealing the cases, the indentations 118*a* and 118*b* provide certain constraining force uniformly in the thickness direction of the coiled and layered electrode plate group 1*a*, 1*b*, which keeps the group 1*a*, 1*b* in shape.

Figure 10B:
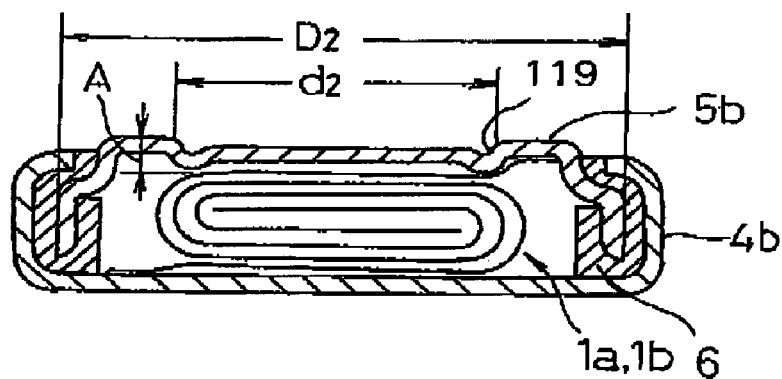

In the example shown in FIG. 10B, the negative electrode case 5*b* is formed with a ring-like indentation 119. The relationship between the diameter d2 of the ring-like indentation 119 and the diameter D2 of the negative electrode case 5*b* is 0.3 D2 d2 0.7 D2. The indentation has a depth A that satisfies the following equations 0.5t A3.0t, where t is the material thickness of the negative electrode case 5*b*. According to this configuration, the indentation 119 provides constraining force to the electrode plate group 1*a*, 1*b*, which resiliently keeps its shape. Thus, even when swelling occurs in the negative electrode case 5*b* due to gas pressure, the electrode plate group 1*a*, 1*b* remains tightly constrained. Although the indentation 119 is formed only in the negative electrode case 5*b* in this example, it will be more effective if it is formed also in the positive electrode case 4*b*. The indentation 119 need not necessarily be formed in a ring-like or circular shape, but it may be of any other shapes to achieve the same effects.

Figure 10C:
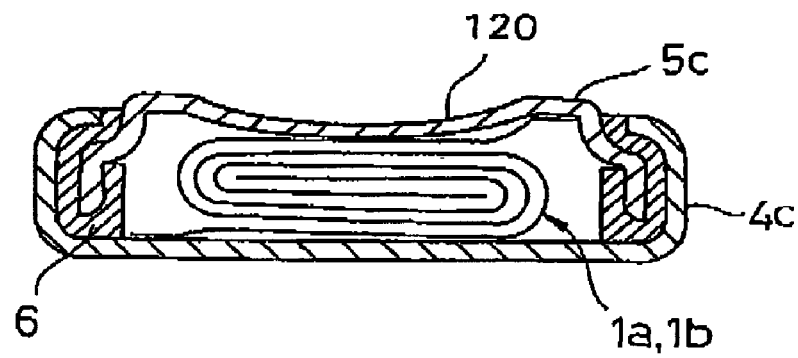

In the example shown in FIG. 10C, the negative electrode case 5*c* is formed with a curved indentation 120 in its bottom face such as to protrude inwards. This indentation 120 provides constraining force to a center portion of the electrode plate group 1*a*, 1*b* where swelling is most likely to occur, whereby the electrode plate group 1*a*, 1*b* is kept in shape, and variations in its thickness direction are prevented. The indentation 120 may of course be provided also to the positive electrode case 4*c*.

With these configurations, because the indentation 120 provides constraining force for the electrode plate group, variations in the layered state of the electrode plates due to gas pressure during the initial period of battery use are prevented.

Figure 11A:
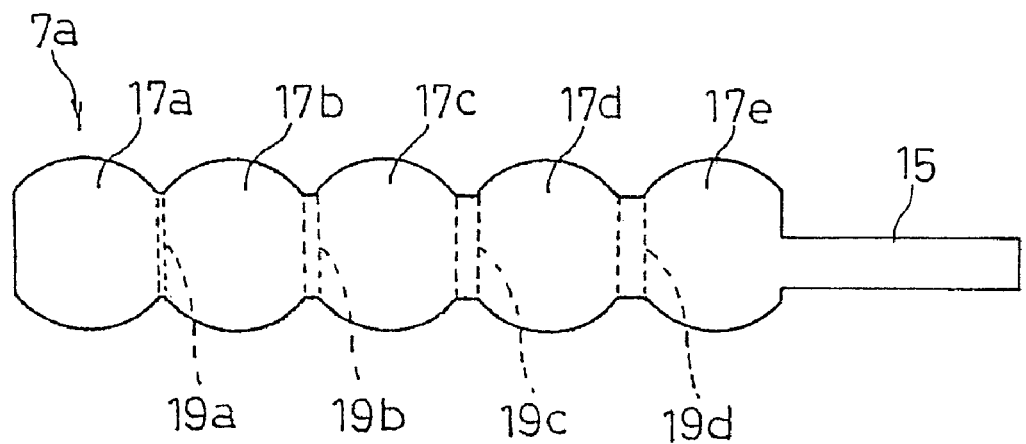
FIG. 11A and FIG. 11B are respective expanded views of a positive electrode plate and a negative electrode plate constituting the electrode plate group of a second embodiment of the present invention.
Figure 11B:
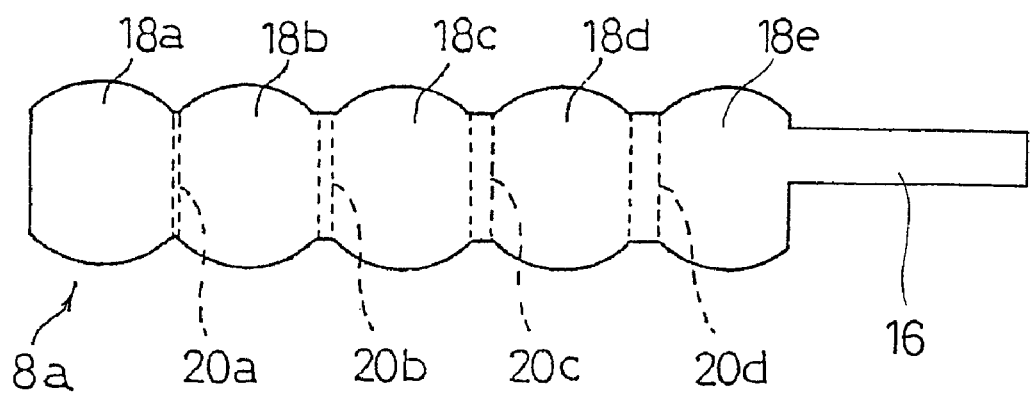

In the above described embodiment, the electrode plate group 1*a*, 1*b* is obtained by coiling around a positive electrode plate 7 and a negative electrode plate 8 of constant width with a separator 9 interposed therebetween and cutting the corners along straight or curved lines. FIG. 11A and FIG. 11B show a second embodiment in which the positive electrode plate 7*a* and the negative electrode plate 8*a* are prepared to have their layered faces formed in arcs, after which they are coiled around into a flat electrode plate group 1*c*.

Figure 12:
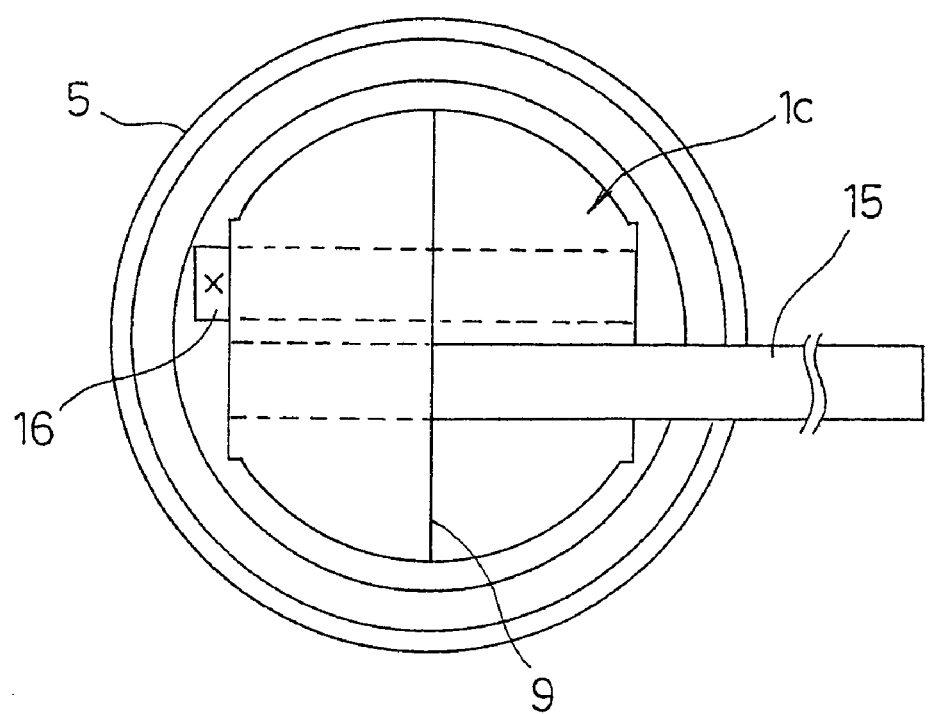
FIG. 12 is a plan view of the electrode plate group of the same embodiment accommodated in a negative electrode case.

As can be seen from FIG. 11A and FIG. 11B, the positive electrode plate 7*a* has a plurality of layer faces 17*a*–17*e* formed with arcs on both sides in the widthwise direction and coupled together by connecting pieces 19*a*–19*d*, and the negative electrode plate 8*a* has a plurality of layer faces 18*a*–18*e* formed with arcs on both sides in the widthwise direction and coupled together by connecting pieces 20*a*–20*d*. The positive and negative electrode plates 7*a*, 8*a* are coiled around into a flat shape by folding them at their respective connecting pieces 19*a*–19*d* and 20*a*–20*d* such that the positive electrode layer faces 17*a*–17*e* and negative electrode layer faces 18*a*–18*e* are alternately layered with the separator 9 interposed therebetween, to form the electrode plate group 1*c*. This electrode plate group 1*c* is accommodated in the negative electrode case 5 with good space efficiency, as shown in FIG. 12. In this case also, the subsequent processing of positive and negative electrode leads 15, 16 and the vacuum dry treatment are performed similarly as with the embodiment described in the foregoing.

Figure 13:
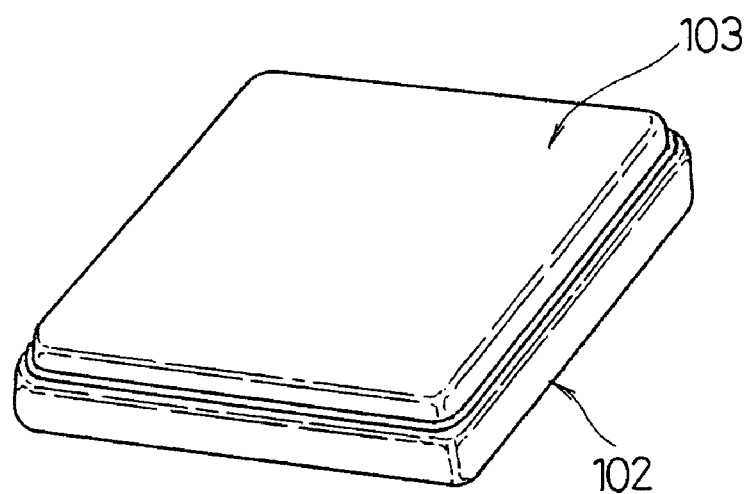
FIG. 13 is a perspective view illustrating one example of a prismatic configuration for a flat battery.

The flat battery described above has a coin shape which is circular in plan view, but it can be constructed as a prismatic flat battery as shown in FIG. 13 (having a rectangular plan). Prismatic flat batteries have not yet found practical use because of the difficulty in sealing straight portions of the open end of the positive electrode case 102 of rectangular half shell form coupled onto the negative electrode case 103 to seal the inner space accommodating elements for electromotive force. However, the case structures shown in FIG. 14A, FIG. 14B, and FIG. 15 will make fabrication of prismatic flat batteries feasible.

Figure 14A:
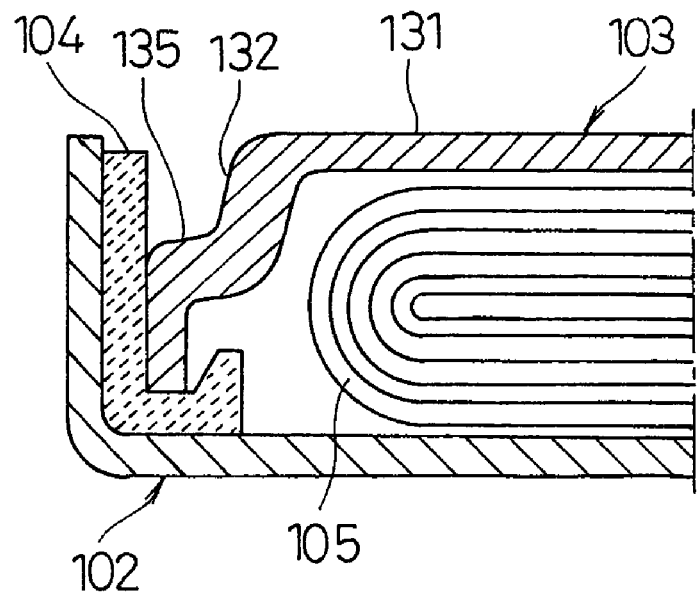
FIG. 14A and FIG. 14B are cross sections of the prismatic flat battery respectively illustrating a state before the case is sealed and a state after the case is sealed.
Figure 14B:
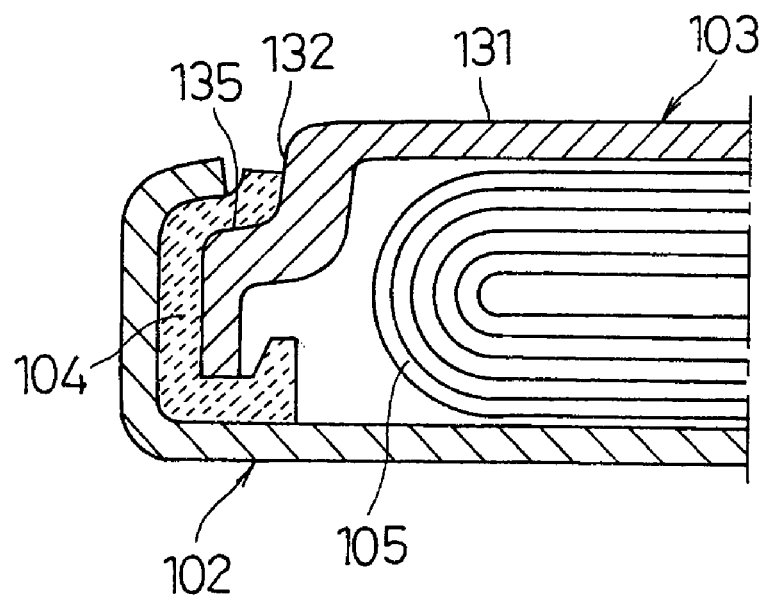
Figure 15:
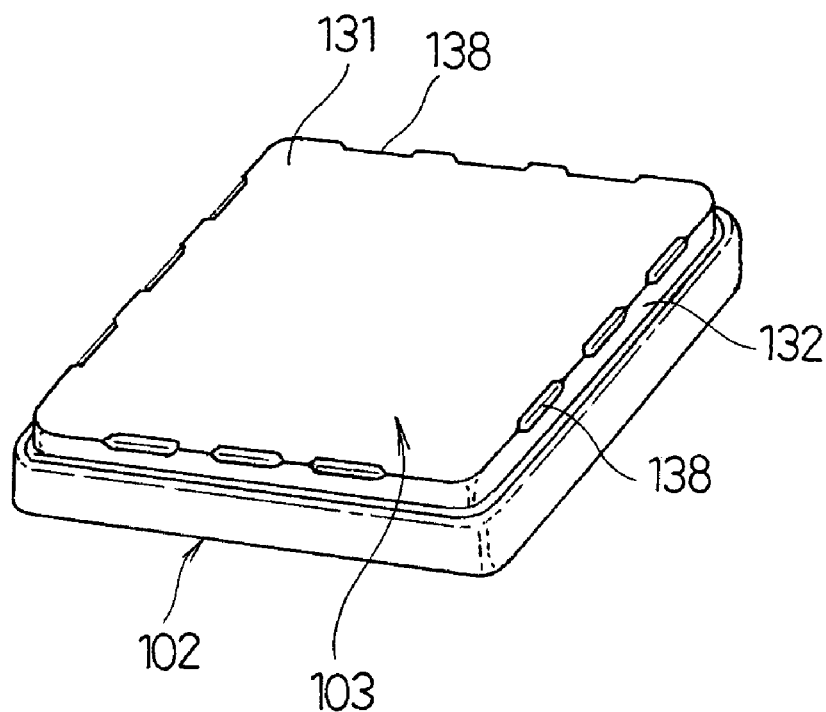
FIG. 15 is a perspective view illustrating one example of a rectangular configuration for a flat battery.
Figure 16:
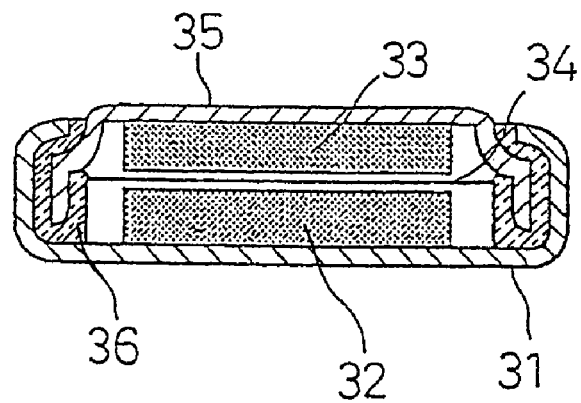
FIG. 16 is a cross-sectional view illustrating the configuration of a conventional coin type battery.

In the case structure shown in FIGS. 14A and 14B, when bending the open end of the positive electrode case 102 from the state shown in FIG. 14A to that of FIG. 14B to compress the gasket 104 onto the step 135 in the negative electrode case 103, the pressure may cause buckling deformation in certain portions in the negative electrode case 103. These portions are formed thicker, so as to prevent deformation of the negative electrode case 103 and to ensure the sealing. Alternatively, by forming inward indentations 138 at corners between the bottom face 131 and lateral faces 132 of the negative electrode case 103 as shown in FIG. 15, deformation of the case 103 during the sealing is prevented, and reliable sealing is achieved.

The intermediate product 17 of electrode plate group 105 for such a prismatic flat battery, which is obtained by coiling the positive and negative electrode plates 7, 8 with the separator 9 interposed therebetween, need not be cut off at its four corners, and it is accommodated in the rectangular space with good space efficiency. In this case also, any of the above-described lead extension structure, press forming with heat-pressing, lead welding, vacuum dry treatment, and shape retaining structure for keeping the shape of the electrode plate group 105 may suitably be applied.

Although, in the present invention, the positive electrode lead 15 and negative electrode lead 16 of the electrode plate group 1a, 1b are respectively connected to the positive electrode case 4 and negative electrode case 5, it is possible to construct the battery so that its terminals are reversed.

INDUSTRIAL APPLICABILITY

According to the flat battery of the present invention, when encasing the electrode plate group of the coiled structure, because the positive and negative electrode leads are not overlaid upon one another, there are no large variations in the thickness of the electrode plate group. Since there is no large difference in the constraining force for keeping the electrode plate group in shape within the battery inner space, the positive and negative electrode plates remain in uniform facing with each other. Also, because the electrode plate group is accommodated in the accommodating space with good volume efficiency, the flat type battery has improved discharge characteristics. Thus, application of such battery to a power source for portable devices, which was considered difficult, is made possible, and it will bring advantages in making these devices smaller, thinner, and lighter.

According to the manufacturing method of flat batteries of the invention, positive and negative electrode plates are coiled around into a rectangular electrode plate group and its corners are cut off so that the electrode plate group is octagonal. Electrode plate groups are thus manufactured in a simple manner, and there is no need to bind the coiled electrode plates with a tape. These electrode plate groups of a coiled structure are accommodated in circular cases with good space efficiency. The method is thus useful in improving productivity of coin type batteries having high discharge current characteristics.

Furthermore, according to the manufacturing method of flat batteries of the invention, the problems encountered in constructing coin type batteries using coiled electrode plate groups are all resolved; it achieves removal of water, elimination of sparks and dust during the welding of leads, and stabilization of constraining force for retaining the shape of electrode plate group. Thus the method is applicable in fabricating highly reliable coin type batteries having high load discharge characteristics due to the coiled structure.

The invention claimed is:

1. A flat battery comprising:
   a positive electrode plate formed as an elongated strip having a length and a width with said length being greater than said width, said length defining in a longitudinal direction of said elongated strip, said width defining in a lateral direction of said elongated strip, first and second strip ends opposing one another in said longitudinal direction, and first and second strip sides opposing one another in said lateral direction;
   a negative electrode plate formed as an elongated strip having a length and a width with said length being greater than said width, said length defining in a longitudinal direction of said elongated strip, said width defining in a lateral direction of said elongated strip, first and second strip ends opposing one another in said longitudinal direction, and first and second strip sides opposing one another in said lateral direction;
   a flat electrode plate group formed in a coil by overlaying said positive electrode plate and said negative electrode plate with said longitudinal directions and said lateral directions coincident, with a separator interposed therebetween, and coiling the positive and negative electrode plates as overlaid along said longitudinal directions beginning at said first ends and ending with said second ends to form a coiled configuration having:
      alternating flat electrode layers of said negative electrode plate and said positive electrode elate extending in planes defined by said longitudinal and lateral directions at said flat electrode layers,
      opposing first and second coil flat sides parallel to said planes of said alternating flat electrode layers,
      first and second coil end sides axially opposing one another and orthogonal to said lateral directions, said first and second coil end sides defining a coil width therebetween equal to said widths of said positive and negative electrode plates, and
      first and second coil edge sides parallel to said lateral directions and interconnecting said first and second coil flat sides, said first and second coil edge sides defining a formed coil length therebetween extending perpendicular to said lateral directions of said positive and negative electrode plates;
   a positive electrode case and a negative electrode case coupled together to define an inner space having opposing first and second end surfaces respectively formed by opposing substantially flat surfaces respectively of said positive electrode case and said negative electrode case;
   the electrode plate group being accommodated in said inner space;
   said electrode plate group including:
      a positive electrode lead extending in said longitudinal direction from said second strip end of said positive electrode plate and having a width narrower than said width of said positive electrode plate, said positive electrode lead being offset alone said lateral direction of said positive electrode plate toward said first strip side;

a negative electrode lead extending in said longitudinal direction from said second strip end of said negative electrode plate and having a width narrower than said width of said negative electrode plate, said negative electrode lead being offset along said lateral direction of said positive electrode plate toward said second strip side; and said positive and negative electrode leads being formed with said offsets to said respective first and second strip sides such that said positive electrode lead and said negative electrode lead do not overlap in a direction normal to said planes defined by said longitudinal and lateral directions at said flat electrode layers; and said positive electrode lead and said negative electrode lead being extended outward from the coil of the electrode plate group and welded respectively to said first and second end surfaces.

2. The flat battery according to claim 1, wherein:

the inner space has a circular plan shape with said first and second end surfaces substantially conforming to said circular plan shape, the electrode plate group is coiled initially into a shape having a rectangular plan with a diagonal length greater than a diameter of said circular plan shape, the positive electrode plate, the negative electrode plate, and the separator all having a constant width corresponding to said widths of said positive and negative electrode plates, and corners of the electrode plate group defined by said rectangular plan are cut off along straight or curved lines after the coiling and prior to installation into said inner space so as to leave at least opposing portions of said first and second coil edge sides and said positive and negative electrode plates in a continuous condition from said first strip ends to said second strip ends.

3. The flat battery according to claim 1, wherein:

the inner space has a circular plan shape with said first and second end surfaces substantially conforming to said circular plan shape, said positive electrode plate and said negative electrode plate are respectively made of a plurality of circular or polygonal layer faces extending serially in said longitudinal directions and coupled together by connecting pieces having a predetermined width, said widths of said positive and negative electrode elate corresponding to widest portions of said plurality of circular or polygonal layer faces, and the positive electrode plate and the negative electrode plate being folded at said connecting pieces and coiled such that the plurality of circular or polygonal layer faces are layered upon and aligned with one another with the separator interposed therebetween.

4. A method for manufacturing a flat battery, comprising:

forming a positive electrode plate as an elongated rectangular strip having active material and having a length and a width with said length being greater than said width, said length defining in a longitudinal direction of said elongated rectangular strip, said width defining in a lateral direction of said elongated rectangular strip, first and second strip ends opposing one another in said longitudinal direction, and first and second strip sides opposing one another in said lateral direction;

forming a negative electrode plate as an elongated rectangular strip having active material and having a length and a width with said length being greater than said width, said length defining in a longitudinal direction of said elongated rectangular strip, said width defining in a lateral direction of said elongated rectangular strip, first and second strip ends opposing one another in said longitudinal direction, and first and second strip sides opposing one another in said lateral direction;

forming a flat electrode plate group as a flattened coil having a rectangular shape with four corners as an intermediate product, including:

overlaying said positive electrode plate and said negative electrode plate with said longitudinal directions and said lateral directions coincident, with a separator interposed therebetween, and coiling the positive and negative electrode plates as overlaid along said longitudinal directions beginning at said first ends and ending with said second ends to form a coiled configuration having:

alternating flat electrode layers of said negative electrode plate and said positive electrode plate extending in planes defined by said longitudinal and lateral directions at said flat electrode layers and parallel to a plane of said rectangular shape opposing first and second coil flat sides parallel to said planes of said alternating flat electrode layers, first and second coil end sides axially opposing one another and orthogonal to said lateral directions, said first and second coil end sides defining a coil width therebetween equal to said widths of said positive and negative electrode plates, and first and second coil edge sides parallel to said lateral directions and interconnecting said first and second coil flat sides, said first and second coil edge sides defining a formed coil length therebetween extending perpendicular to said lateral directions of said positive and negative electrode plates;

cutting off said four corners of said intermediate product along straight or curved lines to form a substantially octagonal electrode plate group as viewed from a direction normal to said alternating flat electrode layers so as to leave at least opposing portions of said first and second coil edge sides and said positive and negative electrode plates in a continuous condition from said first strip ends to said second strip ends;

accommodating said electrode plate group in an inner space having a circular plan defined by a positive electrode case and a negative electrode case of half shell form, said rectangular shape having a diagonal length greater than a diameter of said circular plan shape and which is reduced by said cutting off said four corners to yield a length less than said diameter; and sealing together said positive electrode case and said negative electrode case.

5. The method for manufacturing a flat battery according to claim 4, further comprising:

heating a pressing mold to a predetermined temperature; and heat-pressing said intermediate product into a predetermined shape by using the pressing mold heated to the predetermined temperature and applying predetermined pressure, after which the four corners thereof are cut off.

6. The method for manufacturing a flat battery according to claim 4, wherein the four corners of said intermediate product are cut off by a thermal cutter.

7. The method for manufacturing a flat battery according to claim 4, wherein the four corners of said intermediate product are cut off by a punching process under a temperature of −70° C. or lower.

8. A method for manufacturing a flat battery, comprising:
forming an electrode plate group by coiling around a positive electrode plate having a positive electrode lead at one end thereof and a negative electrode plate having a negative electrode lead at one end thereof with a separator interposed therebetween into a flat shape such that the coiled electrode plate group has the positive electrode lead on one face thereof and the negative electrode lead on the other face thereof at a coiling finish end thereof;
placing said electrode plate group in one of outer cases consisting of a positive electrode case and a negative electrode case of half shell form;
welding said positive electrode lead to an inner face of said positive electrode case;
welding said negative electrode lead to an inner face of said negative electrode case by series welding, wherein while said negative electrode lead is pressed against the inner face of said negative electrode case with an insulating supporter, a pair of welding electrodes is brought to pressure contact with an outer face of the negative electrode case opposite a position where the negative electrode lead is pressed inside, and welding current is applied across the pair of welding electrodes in this state;
vacuum drying said electrode plate group, said positive electrode case and said negative electrode case after said welding; and
sealing an interface of said positive electrode case and said negative electrode case.

9. The flat battery according to claim 1, wherein the positive electrode case and the negative electrode case are coupled to each other with a gasket fitted in an interface of respective lateral peripheral surfaces, and
one of or both of said positive electrode case and said negative electrode case is formed with an inward indentation in said end surfaces thereof, whereby a constraining force is provided for keeping said electrode plate group in shape when said positive electrode case and said negative electrode case are joined.

10. The method for manufacturing a flat battery according to claim 4, further comprising:
heating a pressing mold; and
heat-pressing said intermediate product using said pressing mold when heated in such a manner that higher pressure is applied to four corners thereof, after which said four corners are cut off.

11. The method for manufacturing a flat battery according to claim 8, wherein said positive electrode lead is welded by ultrasonic welding.

12. The method for manufacturing a flat battery according to claim 8, wherein said vacuum drying is carried out at a temperature of 50 to 90° C. with a vacuum degree of 650 mmHg or more for a period of 3 hours or more.

13. The method for manufacturing a flat battery according to claim 7, further comprising coating cut sides produced by said cutting with a resin.

14. The method for manufacturing a flat battery according to claim 4, further comprising coating cut sides produced by said cutting with a resin.

15. The flat battery according to claim 1, wherein said positive electrode lead and said negative electrode lead are extended outward from the coil of the electrode plate group and welded respectively to said first and second end surfaces at positions disposed outside areas of said first and second end surfaces which are coincident with outlines of said coil projected on said first and second end surfaces in directions normal to said first and second end surfaces.

16. A method for manufacturing a flat battery, comprising:
forming a positive electrode plate as an elongated strip, said elongated strip having active material and having:
a length and a width with said length being greater than said width, said length defining in a longitudinal direction of said elongated rectangular strip, said width defining in a lateral direction of said elongated rectangular strip;
first and second strip ends opposing one another in said longitudinal direction;
first and second strip sides opposing one another in said lateral direction;
layer face portions serially arranged in said longitudinal direction; and
interconnecting portions disposed between said layer face portions and connecting said layer face portions, a greatest dimension of said layer face portions extending in said lateral direction defining said width of said elongated strip, and a greatest width of said interconnecting portions extending is said lateral direction being less than said width of said elongated strip;
said positive electrode plate being formed having a positive electrode lead extending in said longitudinal direction from said second strip end of said positive electrode plate and having a width narrower than said width of said positive electrode plate, said positive electrode lead being offset along said lateral direction of said positive electrode plate toward said first strip side;
forming a negative electrode plate as an elongated strip, said elongated strip having active material and having:
a length and a width with said length being greater than said width, said length defining in a longitudinal direction of said elongated rectangular strip, said width defining in a lateral direction of said elongated rectangular strip;
first and second strip ends opposing one another in said longitudinal direction;
first and second strip sides opposing one another in said lateral direction;
layer face portions serially arranged in said longitudinal direction; and
interconnecting portions disposed between said layer face portions and connecting said layer face portions, a greatest dimension of said layer face portions extending in said lateral direction defining said width of said elongated strip, and a greatest width of said interconnecting portions extending is said lateral direction being less than said width of said elongated strip;
said negative electrode plate being formed having a negative electrode lead extending in said longitudinal direction from said second strip end of said negative electrode plate and having a width narrower than said width of said negative electrode plate, said negative electrode lead being offset along said lateral direction of said negative electrode plate toward said second strip side;
overlaying said positive electrode plate and said negative electrode plate with said longitudinal directions and said lateral directions coincident, with a separator interposed therebetween, and with said layer face portions of said positive electrode plate aligned with said layer face portions of said negative electrode plate;

folding the positive and negative electrode plates, as overlaid, along said connecting portions to form a coil by successive folds in said longitudinal directions beginning at said first ends and ending with said second ends to form a coiled configuration having:

alternating flat electrode layers comprised of said layer face portions of said negative electrode plate and said layer face portions of said positive electrode plate, said flat electrode layers extending in planes defined by said longitudinal and lateral directions at said flat electrode layers;

opposing first and second coil flat sides parallel to said planes of said alternating flat electrode layers;

first and second coil end sides axially opposing one another and orthogonal to said lateral directions, said first and second coil end sides defining a coil width therebetween equal to said widths of said positive and negative electrode plates, and first and second coil edge sides parallel to said lateral directions and interconnecting said first and second coil flat sides, said first and second coil edge sides defining a formed coil length therebetween extending perpendicular to said lateral directions of said positive and negative electrode plates;

said positive and negative electrode leads being formed offset such that said positive electrode lead and said negative electrode lead do not overlap in a direction normal to said planes defined by said longitudinal and lateral directions at said flat electrode layers;

accommodating said electrode plate group in an inner space having a circular plan formed by a positive electrode case and a negative electrode case of half shell form;

extending said positive electrode lead and said negative electrode lead from said coil;

welding said positive electrode lead and said negative electrode lead respectively to an inner face of said positive electrode case and to an inner face of said negative electrode case; and sealing together said positive electrode case and said negative electrode case.

* * * * *